(12) United States Patent
Ren et al.

(10) Patent No.: US 8,824,837 B2
(45) Date of Patent: Sep. 2, 2014

(54) INTEGRATION OF OPTOELECTRONICS WITH WAVEGUIDES USING INTERPOSER LAYER

(75) Inventors: Shen Ren, Palo Alto, CA (US); David A. B. Miller, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 233 days.

(21) Appl. No.: 13/199,302

(22) Filed: Aug. 25, 2011

(65) Prior Publication Data

US 2012/0219250 A1    Aug. 30, 2012

Related U.S. Application Data

(60) Provisional application No. 61/402,358, filed on Aug. 26, 2010.

(51) Int. Cl.
| | |
|---|---|
| *G02B 6/12* | (2006.01) |
| *G02B 6/10* | (2006.01) |
| *H01L 21/20* | (2006.01) |
| *G02B 6/136* | (2006.01) |
| *G02B 6/13* | (2006.01) |
| *G02B 6/132* | (2006.01) |

(52) U.S. Cl.
CPC ............ *G02B 6/12004* (2013.01); *G02B 6/136* (2013.01); *G02B 6/131* (2013.01); *G02B 6/132* (2013.01)

USPC .......... 385/14; 385/131; 438/479; 257/E21.09

(58) Field of Classification Search
USPC .......... 385/14, 129–132; 438/29, 24, 34, 455, 438/457, 458.46, 502, 509, 608, 933; 257/184, E31.058, E21.092
See application file for complete search history.

(56) References Cited

U.S. PATENT DOCUMENTS

| | | |
|---|---|---|
| 5,770,472 A | 6/1998 | Zhou et al. |
| 6,645,829 B2 | 11/2003 | Fitzergald |
| 7,354,840 B1 | 4/2008 | Kempf |
| 2007/0104441 A1* | 5/2007 | Ahn et al. ..................... 385/129 |
| 2010/0059822 A1 | 3/2010 | Pinguet et al. |

* cited by examiner

*Primary Examiner* — Uyen Chau N Le
*Assistant Examiner* — Michael Mooney
(74) *Attorney, Agent, or Firm* — Lumen Patent Firm (57) ABSTRACT

Improved integration of optoelectronic devices is provided by a spacer layer laterally sandwiched between distinct regions that are monolithically fabricated onto the same substrate (e.g., by selective epitaxy). An optical waveguide in one of the regions can optically couple to an optoelectronic device in another of the regions through the spacer layer, thereby providing a monolithically integrated form of butt-coupling. Preferably, the spacer layer thickness is less than about 50 nm, and is more preferably less than about 20 nm, to reduce optical loss. The spacer layer is preferably electrically insulating, to prevent shorting of devices grown by selective epitaxy.

17 Claims, 5 Drawing Sheets

US 8,824,837 B2
INTEGRATION OF OPTOELECTRONICS WITH WAVEGUIDES USING INTERPOSER LAYER

CROSS REFERENCE TO RELATED APPLICATIONS

This application claims the benefit of U.S. provisional patent application 61/402,358, filed on Aug. 26, 2010, entitled "Integration of optoelectronics with waveguides using interposer layer", and hereby incorporated by reference in its entirety.

GOVERNMENT SPONSORSHIP

This invention was made with Government support under contract number HR0011-08-9-0001 awarded by the Defense Advanced Research Projects Agency. The Government has certain rights in this invention.

FIELD OF THE INVENTION

This invention relates to monolithic integration of optoelectronic devices.

BACKGROUND

Semiconductor optoelectronic (OE) devices, such as lasers, light emitting diodes, modulators and detectors have been extensively investigated for many years. As a result, optoelectronic device technology is generally at a high level, especially for discrete devices. However, integration of optoelectronic devices remains challenging. Two aspects of optoelectronic device integration are especially noteworthy. The first aspect is that OE integration often entails the use of multiple material systems. For example, Si technology is often preferred for passive waveguides, and non-Si (e.g., Ge, III-V, II-VI etc.) technology is often employed for active OE devices. Integration of active OE devices with Si technology is especially desirable to provide integrated access to the capabilities of Si electronics. The second aspect is that making optical connections between devices is fundamentally more difficult than making electrical connections between devices. For example, there is no optical waveguide technology that provides remotely close to the connection flexibility provided by patterned metal layers in electronic IC technology.

Various partial solutions to OE integration are known. For example, it is known to integrate an OE device with a waveguide, where the waveguide and OE device are in the same material system. It is also known to couple OE devices to waveguides on a photonic integrated circuit, e.g., by using grating couplers, or by butt-coupling a discrete OE device to the photonic integrated circuit.

Some aspects of non-OE integration technology are also of interest. For example, in U.S. Pat. No. 7,354,840, Kempf considers the monolithic integration of an electronic region and an optical region on the same substrate by selective epitaxy. Electrical connections between the electronic region and optical region are considered. However, optical connections are not considered in this work, presumably because the devices in the electronic region (e.g., bipolar transistors, CMOS devices) don't need (and can't accept) optical connections.

Accordingly, it would be an advance in the art to provide improved integration of OE devices.

SUMMARY

Improved integration of optoelectronic devices is provided by a spacer layer laterally sandwiched between distinct regions that are monolithically fabricated onto the same substrate (e.g., by selective epitaxy). An optical waveguide in one of the regions can optically couple to an optoelectronic device in another of the regions through the spacer layer, thereby providing a monolithically integrated form of butt-coupling. Preferably, the spacer layer thickness is less than about 50 nm, and is more preferably less than about 20 nm, to reduce optical loss. The spacer layer is preferably electrically insulating, to prevent shorting of devices grown by selective epitaxy.

Figure 1A:
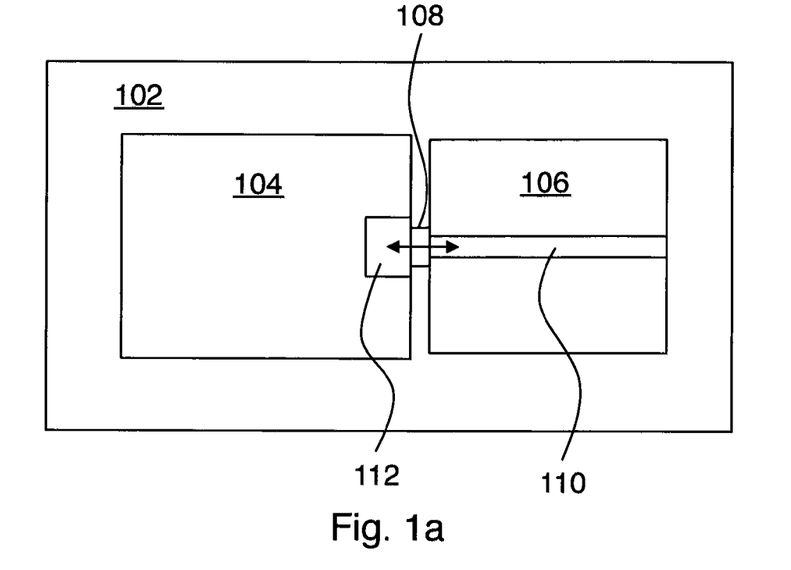
FIGS. 1a-b show top views of two embodiments of the invention.
Figure 1B:
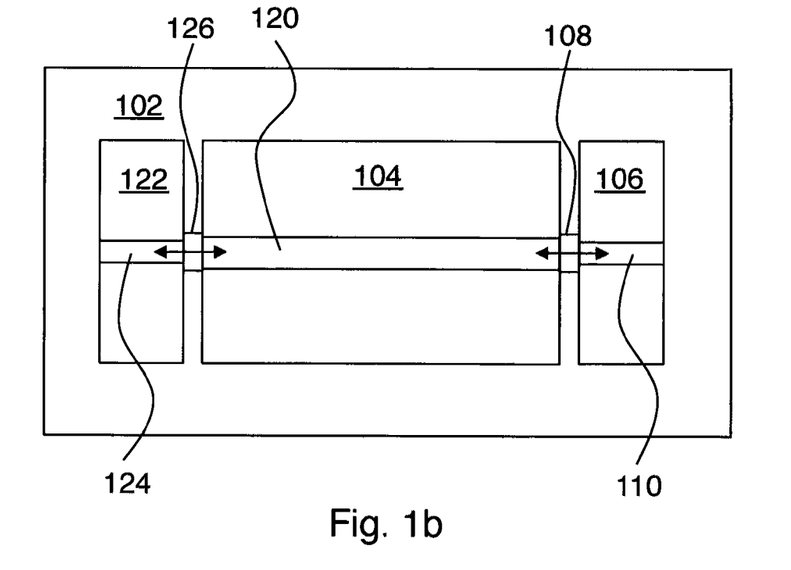

FIGS. 1a-b show top views of some examples of this approach. In the example of FIG. 1a, a first region 104 and a second region 106 are monolithically fabricated on the same substrate 102 and in lateral proximity to each other. First region 104 includes at least one optoelectronic device 112. Suitable optoelectronic devices 112 include, but are not limited to lasers, light emitting diodes, detectors and modulators. Second region 106 includes at least one optical waveguide 110. A first spacer layer 108 is laterally sandwiched between first region 104 and second region 106. Optical waveguide 110 is optically coupled to optoelectronic device 112 through first spacer layer 108.

First spacer layer 108 is preferably electrically insulating, and its thickness is preferably less than about 50 nm (and is more preferably less than about 20 nm). In a preferred embodiment, substrate 102 is a silicon on insulator (SOI) substrate. The first and second regions can be of the same or different material systems. For example, the first region 104 can be any material system suitable for fabrication of OE devices, including but not limited to: Si, Ge, SiGe, III-V alloys and II-IV alloys. Second region 106 can be any material system suitable for fabrication of optical waveguides, such as Si/SiO$_2$ (i.e., Si core waveguides).

The example of FIG. 1a shows a single optical connection. Any number of optical connection can be made in this manner. FIG. 1b shows an example of integrated optical throughput (with 2 connections). In this example, a third region 122 is monolithically fabricated on substrate 102 in lateral proximity to first region 104, and includes a second optical waveguide 124. A second spacer layer 126 is laterally sandwiched between first region 104 and third region 122. The second optical waveguide 124 is optically coupled to first region 104 through second spacer 126.

In the example of FIG. 1b, first region 104 includes an optical modulator 120, so light can propagate between first waveguide 110 and second waveguide 124 through optical modulator 120. This capability of providing optical throughput sharply distinguishes the present integration approach from simply coupling a source or a detector to a waveguide, since there is no possibility for optical throughput in the latter case.

Preferably, the spacer layers are fabricated using a sacrificial layer process. One example of such a process follows. The first step is providing a substrate having a vertical layer structure suitable for fabrication of optical waveguides. The second step is etching one or more trenches having side surfaces and bottom surfaces in the substrate to expose one or more waveguide endfaces on the side surfaces. The third step is depositing a first spacer layer of first spacer material to cover the side surfaces and the bottom surfaces of the trenches. The fourth step is depositing a second spacer layer of second spacer material to cover the first spacer layer on the side surfaces and the bottom surfaces of the trenches.

The fifth step is performing an anisotropic etch of the second spacer layer to substantially remove the second spacer layer from the bottom surfaces, while substantially not affecting the second spacer layer on the side surfaces. The sixth step is performing a first selective etch that substantially removes the first spacer material while substantially not affecting the second spacer material to remove the first spacer layer from the bottom surfaces. The seventh step is performing a second selective etch that substantially removes the second spacer material while substantially not affecting the first spacer material to remove the second spacer layer from the side surfaces. The eighth step is performing selective epitaxy on the bottom surfaces of the one or more trenches to grow one or more optoelectronic device regions. FIGS. 5a-h and the associated description provide an example of this approach.

Preferably, the substrate is a silicon on insulator substrate. In one example, the first spacer material is silicon oxide and the second spacer material is silicon nitride. Here silicon oxide refers to $SiO_2$ and to minor deviations from this stoichiometry as may be expected in silicon technology. Similarly, silicon nitride refers to $Si_3N_4$ and to minor deviations from this stoichiometry as may be expected in silicon technology. Preferably, the first spacer material is selected such that growth does not occur on the first spacer material during the selective epitaxy. The first spacer layer thickness is preferably selected such that optical coupling between one or more optoelectronic devices in the optoelectronic device regions and one or more optical waveguides outside the optoelectronic device regions is provided. Preferably the first spacer layer thickness is less than about 50 nm, and is more preferably less than about 20 nm.

In some cases, lattice matching the optoelectronic device regions to the substrate will require the growth of a lattice matching buffer (e.g., a graded composition buffer) prior to growth of the optoelectronic device regions. In such cases, the trench depth is preferably selected such that the waveguides outside the trenches are vertically aligned to the optoelectronic device regions disposed on the buffer structures (i.e. the buffer thickness is accounted for).

DETAILED DESCRIPTION

The following description relates to a specific example of the above-described general approach for OE integration. This example relates to $SiO_2$ spacers for integrating Ge/SiGe OE devices to silicon waveguides. The motivation for this material system is considered, and theoretical and experimental results are provided.

Introduction

Optical interconnections for integrated-circuit inter- and intrachip communication links have been extensively investigated recently as a possible solution to the electrical interconnect bottleneck in present-day electronic technology. In particular, silicon (Si)-based photonics, which are compatible with the existing complementary metal-oxide-semiconductor (CMOS) technology, are one of the most promising candidates for low-cost, high-density, and large-scale implementation. Optical interconnect systems involve the generation, modulation, propagation, and detection of photons. With a band gap energy of 1.12 eV, silicon is transparent in the telecommunication C-band (1530-1565 nm) and, hence, is an ideal material for optical propagation. Ridge and rib waveguides built on the silicon-on-insulator (SOI) platform have demonstrated very low loss, sharp bending radius, and small footprint.

Germanium (Ge), which is another Group IV material which is already widely adopted in the advanced CMOS technology, has its lowest energy band gap at 0.66 eV and, hence, can be efficient at photon detection in the telecommunication bands. Various surface normal as well as waveguide-based Ge photodetectors on Si substrates have already been demonstrated by several groups, showing high responsivity, low dark current, and high speed operation. Moreover, the Franz-Keldysh effect in bulk GeSi alloy has already been used to demonstrate an electroabsorption waveguide modulator.

Recently the quantum-confined Stark effect (QCSE), a physical mechanism related to the Franz-Keldysh effect but potentially much stronger because of its more abrupt absorption edges and excitonic effects, was demonstrated in Ge/SiGe quantum wells grown on Si substrates. It opens a new approach to build CMOS-compatible optical modulators with low voltage drive, large bandwidth, and potentially very low energy consumption. Several standalone QCSE electro-absorption modulators employing this physical mechanism have already been demonstrated. Monolithically integrating these QCSE modulators with the SOI waveguides can further reduce the device footprint, capacitance, and, even more importantly, power consumption. An additional benefit is that the same epitaxy and device structure can also function as a photodetector. Therefore, by monolithically integrating Ge/SiGe quantum well structures with SOI waveguides, we can simultaneously realize optical modulation, propagation, and detection.

In this work, we present a novel approach to integrate bulk Ge or Ge/SiGe quantum well active sections with SOI waveguides through butt-coupling. In particular, we describe and demonstrate a thin dielectric spacer for this monolithic integration. The following description is organized as follows. First, we give an overview of the integration scheme and motivate the thin spacer layer. Then, numerical analysis will be carried out to evaluate the impact of this spacer layer on the device performance. After that, a dual-layer fabrication process is described and demonstrated to build this thin spacer layer with precise thickness control. Finally, we will discuss the further applications for this spacer and draw conclusions.

Motivation

The incorporation of Ge into SOI waveguides is typically realized through selective epitaxial growth from the underlying crystalline Si. The coupling between the Ge active section and the passive waveguide can be realized by two different approaches. In the first approach, a Ge layer is grown directly from the top crystalline Si layer of the SOI substrate. In this scheme, coupling is realized evanescently using adiabatic tapers. These adiabatic tapers are at least tens of micrometers long. So devices in this category have a large footprint. Furthermore, if the taper is realized in the Ge active section, the devices unavoidably have a large capacitance.

In the second approach, a recess is defined in the top Si layer, and Ge is selectively grown from the remaining crystalline Si inside the recess. In this scheme, the Ge active section and the SOI waveguide are at the same vertical level. The coupling between the two is realized through direct butt coupling. The devices in this category can be very compact and wavelength insensitive since adiabatic tapering is not needed. The sacrifices here are the additional insertion loss and back reflection due to the refractive index mismatch. For short distance interchip and intrachip interconnect applications, where a small device footprint is necessary and some insertion loss can be afforded, this second approach and direct-butt coupling is arguably preferable to the evanescent coupling approach. In this work we consider integrating the active section with the SOI waveguide through direct butt-coupling.

Figure 2A:
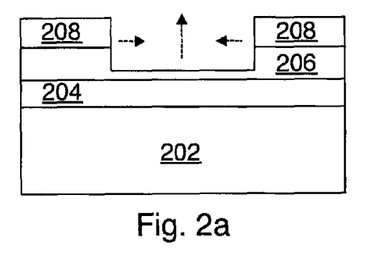
FIGS. 2a-2f show the results of selective epitaxy in structures with and without side wall spacer layers.

The selective epitaxial growth for the second approach is illustrated in FIG. 2a. This example show an SOI wafer having a Si substrate 202, a buried oxide layer 204, a silicon layer 206, and a top oxide layer 208. As indicated by the dashed arrows in the figure, the epitaxial growth will occur from the exposed crystalline Si, both vertically from the bottom of the recess in layer 206 and laterally from the exposed Si facets of layer 206. More seriously, if the two exposed vertical facets are (100) growth planes, the lateral and vertical growth rates may be the same.

This lateral growth is unwanted, and imposes two major limitations. First of all, depending on the relative rates of the vertical and lateral growth, the grown epitaxy may be of an irregular shape and difficult to predict. At the location where the vertical growth joins the lateral growth, misfit dislocations and voids can form, resulting in poor epitaxy quality and device performance. The lateral growth also makes it impossible to grow planar heterostructures, such as quantum wells. Furthermore, even for bulk Ge growth, a chemical-mechanical polishing (CMP) step is needed after the selective epitaxy to planarize the structure.

Figure 2B:
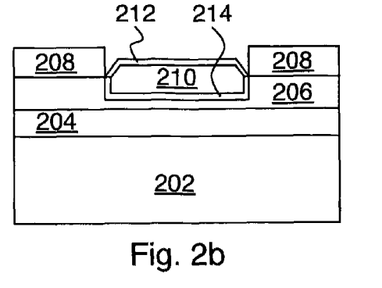

Second, for many applications, such as photodetectors and modulators, a vertical p-i-n structure is needed. If in situ doping is used, the lateral growth of the doped layer will electrically short the intrinsic region. FIG. 2b illustrates the case if in situ doping were added during the selective epitaxy. In this example, layer 214 is p-type Ge, layer 210 is intrinsic Ge, and layer 212 is n-type Ge. It is apparent that layer 210 is shorted because layer 214, which is electrically conductive, makes contact with the sides of intrinsic layer 210. Thus, if layer 210 were to include multiple vertically separated quantum wells (a common configuration for an intrinsic layer), these quantum wells would be undesirably electrically connected to each other (i.e., shorted) by layer 214. A common work-around is to dope the starting thin Si through ion implantation and rapid thermal annealing (RTA) instead. However, ion-implantation can generate crystalline defects in the growth template, which will degrade the quality of the subsequent growth. High-temperature RTA imposes additional thermal budget constraints on the fabrication of the CMOS circuitry if it is to be integrated together with the optical interconnects. Furthermore, recent work shows that a higher activated doping level and a sharper transition boundary between the doped and intrinsic regions can be achieved with in situ doped Ge, which will be of great importance for high speed devices.

Figure 2C:
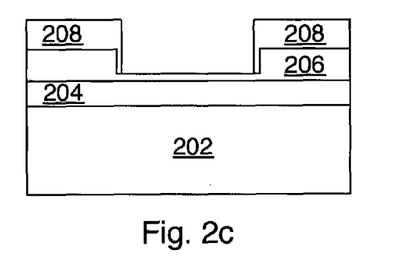
Figure 2D:
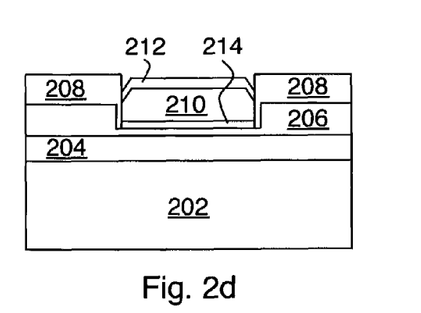

To avoid the unwanted lateral growth, the present approach is based on inserting a dielectric insulating spacer layer at the sidewall of the growth window. The most commonly used insulating dielectric in CMOS technology is $SiO_2$. FIG. 2c illustrates the growth template with $SiO_2$ spacers on both sides of the exposed crystalline Si waveguide. With the spacer in place, the lateral growth will not initiate. This makes it possible to achieve in situ doping for bulk Ge active sections, as in FIG. 2d and, more importantly, to grow planar Ge quantum well heterostructures in the active section. On FIG. 2d, layers 212 and 214 do not touch each other, so intrinsic layer 210 is not shorted.

Figure 2E:
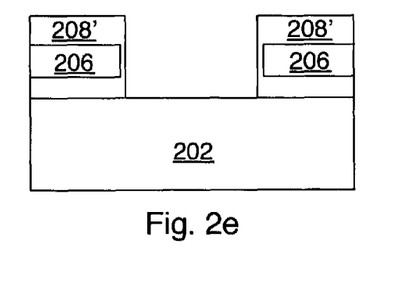
Figure 2F:
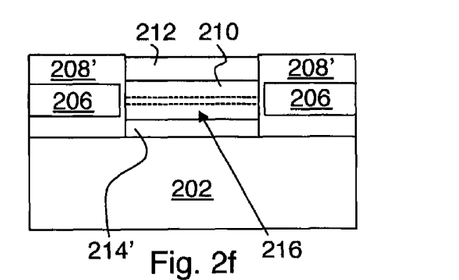

One subtle difference between growing bulk Ge and Ge/SiGe quantum wells is that the active Ge/SiGe quantum wells need to be grown on a relaxed buffer at least several hundred nanometers thick so that there is no net built-in strain. On the other hand, the top Si layer for most SOI waveguides is only around 300 nm thick. To accommodate this relaxed buffer, the buried oxide (BOX) layer in the growth window can be removed before the selective growth, as shown in FIG. 2e. The growth will start from the top surface of the handle substrate of the SOI wafer. FIG. 2f shows the resulting structure. Here intrinsic layer 210 includes Ge (or SiGe) quantum wells 216, and p-type layer 214' can include a graded buffer if/as needed to provide lattice matching of the quantum wells to substrate 202.

There is an additional benefit from using this deep trench approach. While the majority of the BOX can be removed by reactive ion etching (RIE) to maintain a vertical sidewall, wet hydrofluoric acid (HF) can be used to remove the lower portion of the oxide layer immediately above the handle substrate. This avoids any dry-etching induced damage on the growth surface, preserves the crystal quality of the underlying crystalline silicon, and hence improves the epitaxial quality of the grown film. Some Si or low percentage SiGe alloy can be selectively grown first to fill part of the BOX region and act as the bottom cladding in the active section.

Numerical Analysis

There is a large difference in refractive index between Si (3.52) and $SiO_2$ (1.455) in the near infrared region. The introduction of such a $SiO_2$ spacer layer into the structure will inevitably cause some insertion loss. In this section, we will study this insertion loss in detail. To evaluate the insertion loss due to the spacer only, i.e., not that from the index difference between the SOI waveguide and the active Ge section, we will evaluate the coupling from the entrance SOI waveguide to the spacer, and then to an exit SOI waveguide. First, we give a 1-D analytical model using the transfer matrix method to gain some physical intuition. Then, a 3-D finite-difference time-domain method (3D-FDTD) will be used to quantify the insertion loss numerically.

Figure 3:
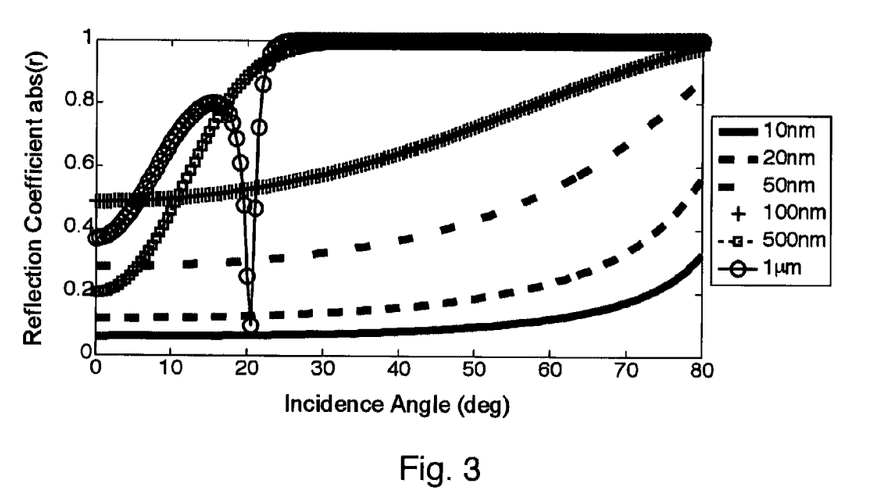
FIG. 3 shows the reflection coefficient as a function of angle for an $SiO_2$ layer surrounded by Si.

In the ray-optics picture, modes in an optical waveguide can be considered as the superposition of plane waves incident at various angles. These plane wave components experience total internal reflection (TIR) when hitting the boundaries between the core and the cladding of the waveguide. Neglecting the Goos-Hanchen shift associated with the TIR, the propagation of each plane wave component can be treated as that in a uniform medium with a refractive index of the waveguide core. For each plane wave component, the problem of transmission through the $SiO_2$ spacer can be treated by the well-known transfer matrix method. In particular, for a 3-layer problem, the reflection coefficient can be evaluated analytically as $$r = -\frac{e^{-i2k_{z1}d}(k_{z2} - k_{z1})(k_{z1} + k_{z0}) + (k_{z2} + k_{z1})(k_{z1} - k_{z0})}{e^{-i2k_{z1}d}(k_{z2} - k_{z1})(k_{z1} - k_{z0}) + (k_{z2} + k_{z1})(k_{z1} + k_{z0})} \quad (1)$$

where $k_{z0}$, $k_{z1}$, and $k_{z2}$ are the z-components of the complex wave vector s in Si, $SiO_2$, and Si, respectively, and d is the thickness of the SiO$_2$ spacer layer. We evaluate the behavior at λ=1.55 μm. In the calculations, the refractive indices for Si and SiO$_2$ are assumed to be 3.52 and 1.455, respectively. Using (1), we plot the reflection coefficient for different incidence angles with different spacer layer thicknesses in FIG. 3. For thicknesses below 200 nm, the reflection coefficient increases monotonically with increasing incidence angle and increasing spacer layer thickness. We should note that the TIR angle between Si and SiO$_2$ is $\phi_c$=24.3°. If the plane wave component experiences TIR vertically between the Si core and the SiO$_2$ cladding, the relevant incidence angles at the interface between the Si core and the SiO$_2$ spacer are θ<90−$\phi_c$=65.7°. For spacer layer thicknesses below 20 nm, the field reflection coefficient in this range is less than 0.3, corresponding to less than 10% reflected optical power. For 24.3°<θ<65.7°, frustrated TIR takes place for thicknesses less than ~200 nm, allowing some transmission, while for thicknesses larger than 500 nm the TIR is essentially complete in this angular range. For thick spacers, there are reflection minima due to interference for angles <24.3°, but these occur only for a very narrow incidence angle range. Based on this simple model, we do expect that there is substantial variation in the reflection of the different angular components of the beam: A simple "normal incidence" reflection model is clearly not valid. This model also shows that, for thin spacers (e.g., 20 nm or less), we can expect relatively low reflection resulting from this layer, even over a broad range of angles.

Of course, the above 1-D model in the ray optics picture is somewhat naive. Specifically, though it can model a beam of a finite size, like the waveguide mode, it does not properly include the effects of the reflections at the (horizontal) core-cladding interfaces. To quantitatively evaluate the insertion loss, a full-wave 3-D FDTD method is used. In the analysis, the fundamental quasi-TE mode of a 500 nm wide and 300 nm high SOI waveguide at 1.55 μm is considered. This mode is launched from the entrance SOI waveguide, transmitted through the SiO$_2$ spacer, and then couples into the exit SOI waveguide. The grid size in the propagation direction is chosen to be 1 nm, which is fine enough for the thinnest spacer of 10 nm. Transmitted (T), scattered (S), and reflected (R) optical powers are normalized to the incident optical power, and calculated numerically, with the results shown in FIG. 4.

Figure 4:
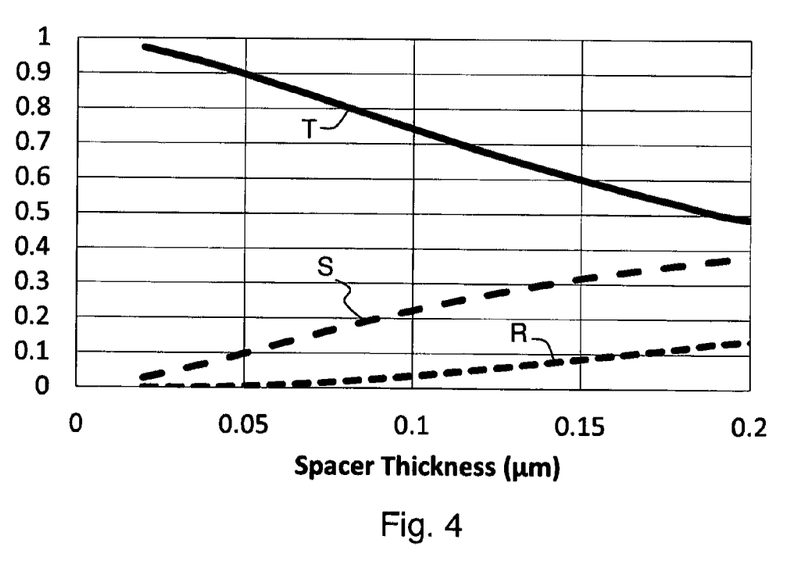
FIG. 4 shows FDTD simulation results for transmission, reflection and scattering for various thickness $SiO_2$ spacers inserted into a Si waveguide.

We can see that the transmission for a 20-nm spacer is more than 97%, which is equivalent to an insertion loss of 0.13 dB. More than 90% of optical power can be transmitted for spacers thinner than 50 nm (less than 0.46 dB insertion loss). This high transmitted optical power corresponds to almost perfect transmission. As the spacer thickness increases, the scattered and reflected optical powers increase, while the transmitted optical power decreases.

Fabrication Process

As the numerical analysis in the previous section shows, the thickness of the spacer layer is a critical parameter. First, the thinner the spacer layer is, the lower the insertion loss is. Second, variations in the spacer thickness directly translate to variations of the insertion loss of the devices. So, reliably and uniformly fabricating this very thin spacer is crucial. Since epitaxial growth will be carried out afterward, the very thin spacer has to be formed on and only on the vertical facet sidewall—not on top of the growth window. Furthermore, it is highly desirable that no additional damage is done to the growth window due to the fabrication of the spacer. In this section, we will demonstrate such a process to realize a very thin, sub-30-nm-thick spacer with precise thickness and uniformity control.

FIGS. 5a-h show an exemplary detailed process flow. Starting with an SOI substrate [see FIG. 5a], we first etch the top Si layer 206 and the majority of the thickness of the BOX 204 using RIE [see FIG. 5b]. Then, a wet HF etch is used to remove the small remaining thickness of the BOX 204, reaching the handle Si substrate 202 [see FIG. 5c]. A conformal SiO$_2$ layer 502 is then deposited, preferably by low-pressure chemical vapor deposition (LPCVD) and densified [see FIG. 5d]. The thickness of this SiO$_2$ layer can be accurately controlled by the deposition time and determines the final thickness of the SiO$_2$ sidewall spacer. Next, a conformal stoichiometric silicon nitride Si$_3$N$_4$ layer 504 is deposited, also preferably by LPCVD [see FIG. 5e]. A highly anisotropic RIE, using CHF$_3$, CF$_4$, and O$_2$, is then used to etch the nitride on the top surface of the growth window, stopping on the underlying deposited SiO$_2$. Due to the etching anisotropy, a Si$_3$N$_4$ spacer remains on the sidewall [see FIG. 5f]. A HF wet etch then removes the deposited SiO$_2$ 502 on the growth window. During this step, the Si$_3$N$_4$ spacer 504 prevents the SiO$_2$ layers 502 on the sidewalls of the growth trench from being removed [see FIG. 5g]. Finally, a selective wet etch (e.g., hot phosphoric acid) removes the Si$_3$N$_4$ spacer 504 from the trench side walls without removing SiO$_2$ layer 502 from the side walls [see FIG. 5h]. The resulting structure has trench side walls covered by SiO$_2$, thereby eliminating the above-described problems associated with lateral growth during selective epitaxy.

Figure 5A:
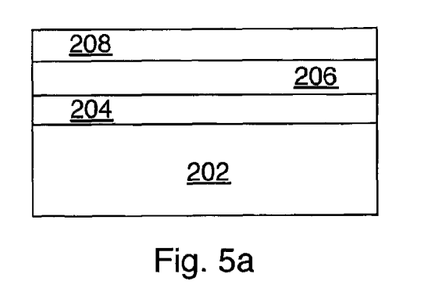
FIGS. 5a-h show a preferred fabrication sequence for making some embodiments of the invention.
Figure 5B:
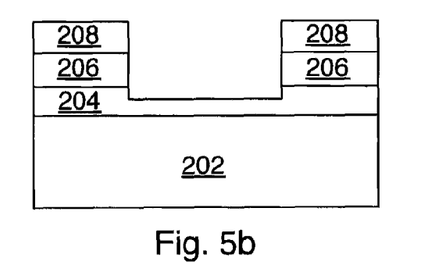
Figure 5C:
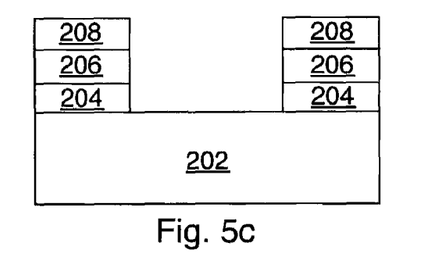
Figure 5D:
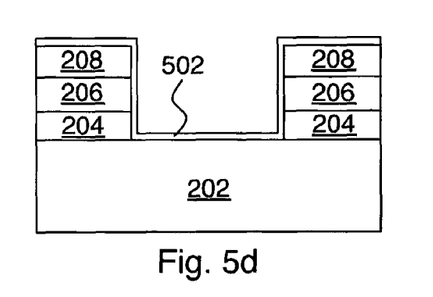
Figure 5E:
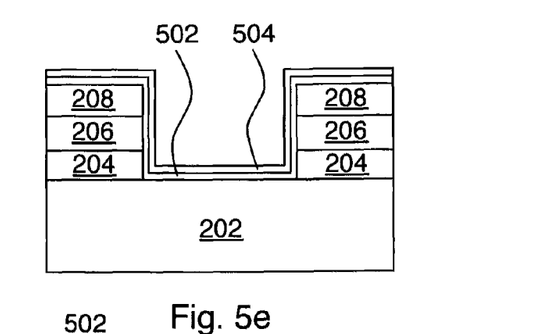
Figure 5F:
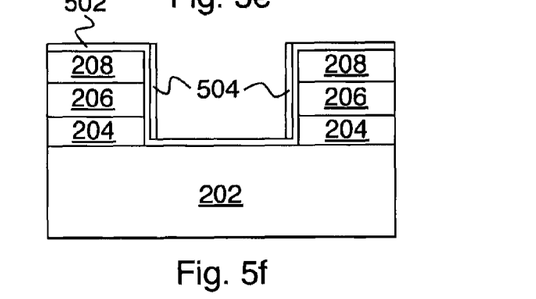
Figure 5G:
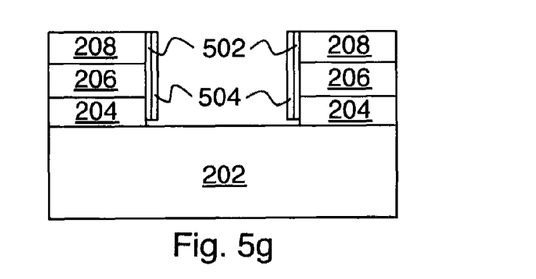
Figure 5H:
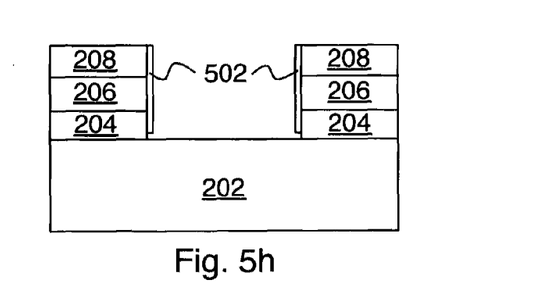
Figure 6:
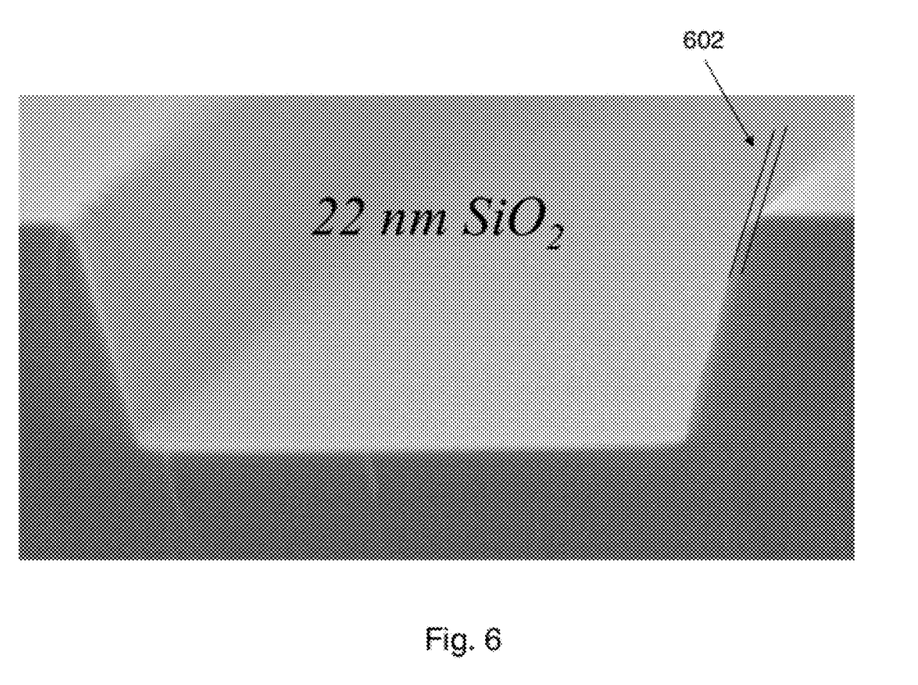
FIG. 6 is a TEM image showing exemplary results from the fabrication sequence of FIGS. 5a-h.

The SiO$_2$ spacer can, in principle, be fabricated without the sacrificial Si$_3$N$_4$ layer by using a highly anisotropic SiO$_2$ RIE on the structure of FIG. 5d. However, typically the etching rate of RIE varies from the center to the edges of a wafer, which would lead to undesirable process variability. In contrast, the use of a sacrificial Si$_3$N$_4$ layer allows the spacer thickness to be precisely controlled. And more importantly, very good uniformity can be achieved across the entire wafer without fine tuning of the dry etching process. Moreover, in the process flow of FIGS. 5a-h, no direct etching plasma hits the surface of the crystalline Si in the growth window, hence avoiding additional damage due to the fabrication of this spacer. Using this process, we fabricated a 22-nm SiO$_2$ spacer (thickness indicated by lines 602) on a sloped Si sidewall of approximately 80°, as shown in FIG. 6. This also shows that a perfect 90° sidewall facet is not essential to the fabrication of this thin spacer. Note that in the process flow of FIGS. 5a-h, we removed the BOX layer. It is also possible to use shallower trenches, such that selective epitaxy will be performed on Si layer 206 as opposed to substrate 202. Once such trenches are formed, the steps of FIGS. 5d-5h can be employed.

DISCUSSION AND CONCLUSION

Our motivation for this specific spacer is the integration of p-i-n bulk Ge or Ge/SiGe quantum wells with a SOI waveguides. However, the use of this kind of spacer is by no means limited to these applications. Monolithic integration in III-V material systems has, for a long time, attracted much research interest. Various approaches, such as selective epitaxial growth/regrowth, offset quantum well growth, and quantum well intermixing, have been successfully demonstrated. Using a thin spacer with selective epitaxial growth adds yet another technique to the existing toolkit. For example, a thin spacer layer can replace proton implantation to provide electrical isolation and current confinement for III-V edge emitting lasers coupled to passive waveguides. Although our numerical analysis is done for the coupling between two SOI waveguides with a SiO$_2$ spacer in between, we expect similar conclusions in other types of waveguide systems. Furthermore, in our fabrication approach, we chose SiO$_2$ as the spacer material and Si$_3$N$_4$ as the sacrificial material, since these two materials are commonly used in CMOS technology. However, this dual-layer spacer fabrication approach is quite general, and should also apply to other dielectric materials. For example, Ge oxynitride or Ge oxide might be preferred as the spacer material to provide better passivation for the subsequently grown Ge epitaxy. Moreover, recent progress on atomic layer deposition techniques for dielectric materials can lead to even more precise control of the spacer thickness.

In conclusion, we discussed various approaches to integrate p-i-n bulk Ge or Ge/SiGe quantum wells with SOI waveguides. We consider an insulating dielectric spacer to be inserted at the sidewall facet of the SOI waveguide to prevent unwanted lateral growth. Through numerical calculation, we show that the additional insertion loss can be lower than 0.13 dB for spacers thinner than 20 nm. A robust fabrication process using a sacrificial nitride layer is described and demonstrated to realize such thin spacer layers with precise thickness control and excellent uniformity.

The invention claimed is:

1. Apparatus comprising:
   a substrate;
   a first region monolithically fabricated on the substrate and including a first optoelectronic device;
   a second region monolithically fabricated on the substrate in lateral proximity to the first region and including a first optical waveguide; and
   a first spacer layer laterally sandwiched between the first region and the second region;
   wherein the first optical waveguide is optically coupled to the first optoelectronic device through the first spacer layer.

2. The apparatus of claim 1, wherein the first spacer layer is electrically insulating.

3. The apparatus of claim 1, wherein the first region and the second region are of different material systems.

4. The apparatus of claim 3, wherein the first region includes one or more optoelectronic devices fabricated in a material system selected from the group consisting of Si, Ge, SiGe, III-V alloys and II-VI alloys.

5. The apparatus of claim 3, wherein the second region includes one or more optical waveguides having silicon cores.

6. The apparatus of claim 1, wherein a thickness of the first spacer layer separating the first region from the second region is less than about 50 nm.

7. The apparatus of claim 1, wherein the substrate is a silicon on insulator substrate.

8. The apparatus of claim 1, wherein the first optoelectronic device is a device selected from the group consisting of semiconductor laser, light emitting diode, optical modulator and optical detector.

9. The apparatus of claim 1, further comprising:
   a third region monolithically fabricated on the substrate in lateral proximity to the first region and including a second optical waveguide;
   a second spacer layer laterally sandwiched between the first region and the third region;
   wherein the second optical waveguide is optically coupled to the first region through the second spacer layer.

10. The apparatus of claim 9, wherein optical radiation can propagate between the first optical waveguide and the second optical waveguide through one or more optoelectronic devices in the first region.

11. A method of fabricating an optoelectronic integrated circuit, the method comprising:
    providing a substrate having a vertical layer structure suitable for fabrication of optical waveguides;
    etching one or more trenches having side surfaces and bottom surfaces in the substrate to expose one or more waveguide endfaces on the side surfaces;
    depositing a first spacer layer of first spacer material to cover the side surfaces and the bottom surfaces;
    depositing a second spacer layer of second spacer material to cover the first spacer layer on the side surfaces and the bottom surfaces;
    performing an anisotropic etch of the second spacer layer to substantially remove the second spacer layer from the bottom surfaces, while substantially not affecting the second spacer layer on the side surfaces;
    performing a first selective etch that substantially removes the first spacer material while substantially not affecting the second spacer material to remove the first spacer layer from the bottom surfaces;
    performing a second selective etch that substantially removes the second spacer material while substantially not affecting the first spacer material to remove the second spacer layer from the side surfaces; and
    performing selective epitaxy on the bottom surfaces of the one or more trenches to grow one or more optoelectronic device regions.

12. The method of claim 11, wherein the substrate is a silicon on insulator substrate.

13. The method of claim 11, wherein the first spacer material comprises silicon oxide and the second spacer material comprises silicon nitride.

14. The method of claim 11, wherein the first spacer material is selected such that growth does not occur on the first spacer material during the selective epitaxy.

15. The method of claim 11, wherein the selective epitaxy includes a step of growing a buffer structure for lattice matching the optoelectronic device regions to the substrate prior to growing the optoelectronic device regions, and wherein a depth of the trenches is selected to provide vertical alignment of waveguides outside the trenches to the optoelectronic device regions disposed on the buffer structures.

16. The method of claim 11, further comprising selecting a thickness of the first spacer layer such that optical coupling between one or more optoelectronic devices in the optoelectronic device regions and one or more optical waveguides outside the optoelectronic device regions is provided.

17. The method of claim 16, wherein the thickness of the first spacer layer is less than about 50 nm.

* * * * *